United States Patent
Chambers et al.

(10) Patent No.: US 6,763,240 B1
(45) Date of Patent: Jul. 13, 2004

(54) HIGH MARGIN NOTIFICATION METHOD AND APPARATUS

(75) Inventors: Paul Chambers, High Wycombe (GB); Charles Chambers, Great Shelford (GB); Gunnar Arvid Bjornstrom, Rancho Palos Verdes, CA (US)

(73) Assignee: Inmarsat Ltd., London (GB)

( * ) Notice: Subject to any disclaimer, the term of this patent is extended or adjusted under 35 U.S.C. 154(b) by 0 days.

(21) Appl. No.: 09/308,498
(22) PCT Filed: Nov. 20, 1997
(86) PCT No.: PCT/GB97/03185
  § 371 (c)(1),
  (2), (4) Date: Oct. 15, 1999
(87) PCT Pub. No.: WO98/23046
  PCT Pub. Date: May 28, 1998

(30) Foreign Application Priority Data

Nov. 20, 1996 (GB) ............................................. 9624105

(51) Int. Cl.⁷ ................................................ H04Q 7/20
(52) U.S. Cl. ......................... 455/466; 455/69; 455/427; 455/522; 455/435.1
(58) Field of Search ....................... 455/69, 522, 435.1, 455/12.1, 427, 466; 714/748, 749; 370/428

(56) References Cited

U.S. PATENT DOCUMENTS

| | | | |
|---|---|---|---|
| 5,392,451 A | | 2/1995 | Schwendeman et al. |
| 5,561,702 A | * | 10/1996 | Lipp et al. ................. 340/7.41 |
| 5,884,170 A | | 3/1999 | Valentine et al. |
| 5,918,174 A | * | 6/1999 | Chennakeshu et al. ..... 455/427 |
| 5,933,763 A | * | 8/1999 | Wang et al. |
| 6,046,990 A | * | 4/2000 | Chennakeshu et al. ..... 370/317 |
| 6,088,589 A | * | 7/2000 | Valentine et al. |
| 6,212,658 B1 | * | 4/2001 | Le Van Suu .................. 455/62 |

FOREIGN PATENT DOCUMENTS

| | | |
|---|---|---|
| EP | 0 365 885 B1 | 5/1990 |
| EP | 0 365 885 A2 | 5/1990 |
| EP | 0 417 986 | 3/1991 |
| EP | 0 510 789 A1 | 10/1992 |
| EP | 0 510 789 B1 | 10/1992 |
| EP | 0 533 509 | 3/1993 |
| EP | 0 575 678 B1 | 5/1993 |
| EP | 0 551 126 | 7/1993 |
| EP | 0 575 678 A1 | 12/1993 |
| EP | 0 648 027 B1 | 4/1995 |
| EP | 0 648 027 A1 | 4/1995 |
| GB | 2 253 972 | 9/1992 |
| GB | 2 295 296 A | 5/1996 |
| GB | 2 317 303 A | 9/1996 |
| WO | WO 88 04496 | 6/1988 |
| WO | WO 95/28747 | 10/1995 |
| WO | WO 96/03814 | 2/1996 |
| WO | WO 96 08941 | 3/1996 |
| WO | WO 96 21332 | 7/1996 |
| WO | WO 97/18650 | 5/1997 |
| WO | WO 97/42787 | 3/1998 |
| WO | WO 98/13954 | 4/1998 |
| WO | WO 98/31165 | 7/1998 |

* cited by examiner

Primary Examiner—Quochien B. Vuong
(74) Attorney, Agent, or Firm—Banner & Witcoff, Ltd.

(57) ABSTRACT

In a mobile communications system 10, a message is sent to a mobile terminal 16 which transmits an acknowledgement signal if the message is received. If the system 10 does not detect an acknowledgement signal, it transmits a high margin notification signal to the mobile terminal 16 to notify the terminal that an attempt was made to send the message. When the mobile terminal 16 has received a notification signal and subsequently comes within range of lower margin signals from the system, it sends a registration signal to the system. The system may then retransmit the message to the mobile terminal 16.

28 Claims, 5 Drawing Sheets

HIGH MARGIN NOTIFICATION METHOD AND APPARATUS

TECHNICAL FIELD

The present invention relates to a high margin notification method and apparatus, particularly for use in a mobile communication system.

BACKGROUND ART

Terrestrial cellular communication systems are well-known in the art and a number of standards exist which define different signalling protocols for them, such as the GSM standard and the PCN standard. Details of these standards are given for example in "Mobile Radio Technology" by Gordon White, Butterworth Heinemann, 1994. The GSM and PCN systems are digital communication systems and allow paging and data communications in addition to voice communications. In the GSM system, a short message service (SMS) is provided for transmitting short messages to mobile terminals.

Mobile satellite communication systems have also been proposed in which radio frequency links are provided by a constellation of satellites. These satellite communication systems provide much greater coverage than terrestrial cellular systems. One example of such a system is the ICO™ system, aspects of which are described in patent publications WO 95/28747, WO 96/03814 and GB 2,295,296A. Other examples include the Inmarsat™ satellite system as described in "Satellite Communications: Principles and Applications" by Calcutt and Tetley, published 1994 by Edward Arnold, the Iridium™ satellite cellular system, described for example in EP-A-0365885, and the Odyssey™ system described for example in EP-A-0510789, EP-A-0575678 and EP-A-0648027.

However, in both terrestrial and satellite mobile communication systems, it is not always possible to communicate with a mobile user, since the received signal strength at the mobile user terminal may be severely attenuated, for example by blockage or multi-path fading. Furthermore, the gain of the user terminal may be low, for example because the user terminal antenna is retracted or not deployed in the optimum position.

A satellite paging system is disclosed in U.S. Pat. No. 5,392,451 in which, if a call receiver does not acknowledge receipt of a paging message, the paging signal is repeated with a higher transmission power.

A paging system is disclosed in WO96/08941 in which, if a mobile telephone does not respond to a paging signal, the paging signal is sent on a different channel, with more error correction or higher power if necessary.

However, the transmission power of a satellite is limited by the power supply available, such as the output power of solar cells of the satellite or by the battery power of the satellite during an eclipse.

STATEMENT OF THE INVENTION

According to one aspect of the present invention, there is provided a method and an apparatus in which, if a message is not acknowledged by a mobile terminal, a different message, such as a shorter message, is transmitted to the mobile terminal with a higher margin. The different message may be selected so as to minimise the total energy needed to transmit it, whilst still sending sufficient meaningful data to the mobile terminal. In this way, the total transmit power required to provide such a service may be kept below a predetermined limit.

In accordance with another aspect of the present invention, there is provided a method and apparatus for registering a mobile terminal with a communication network, in which the mobile terminal receives a high penetration signal from the network and waits until it is in range of a lower penetration signal before sending a registration signal to the network so that information about the mobile terminal can be updated by the network. In this way, registration is initiated by means of a high penetration signal, thus increasing the probability of the mobile terminal receiving this signal, but registration is completed by means of lower penetration signals, thereby reducing the need for transmission of high penetration signals.

BRIEF DESCRIPTION OF THE DRAWINGS

Specific embodiments of the invention will now be described with reference to the accompanying drawings, in which.

MODES OF CARRYING OUT THE INVENTION

Network

Figure 1:
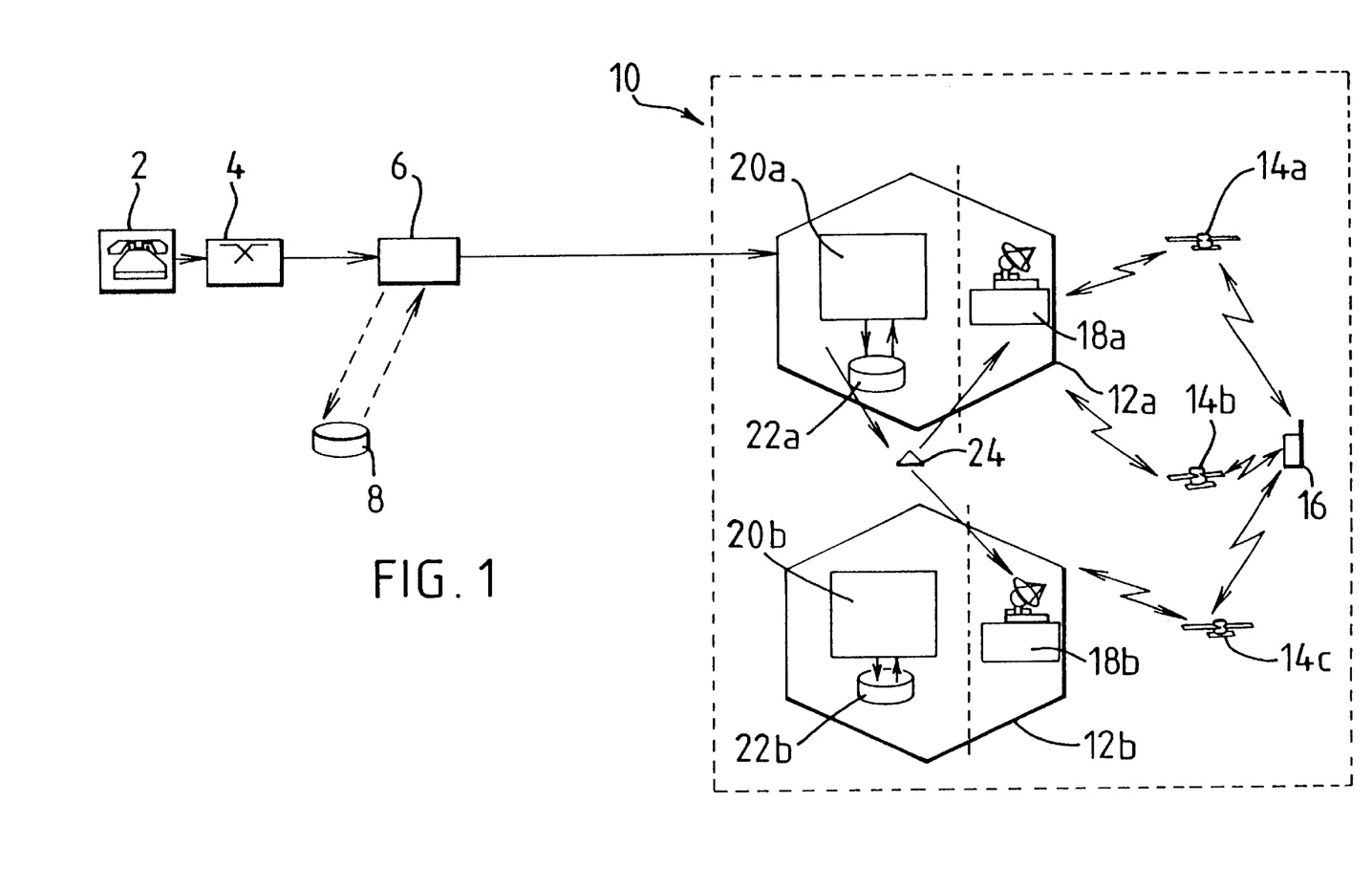
FIG. 1 is a schematic diagram of a mobile satellite system network including a short message service centre, in an embodiment of the present invention.

FIG. 1 shows schematically part of a satellite communications network used for communication of short messages and high-penetration notification messages to a mobile user.

A fixed user 2 is connected to a public service telephone network (PSTN) 4. By dialling an appropriate number, the fixed user 2 is connected through the PSTN 4 to a short message service (SMS) service centre 6, which controls the sending of short messages to a mobile user by selecting the most appropriate network connection. By communicating with a home location register (HLR) 8, the SMS service centre 6 is able to obtain location and customer profile information relating to the called mobile user.

The SMS service centre 6 is connected by appropriate communications links to one or more mobile communications networks which allow communication with mobile terminals. For example, the SMS service centre 6 may be connected both to a terrestrial cellular network conforming to the GSM standard and supporting the GSM short message service and to a mobile satellite system and may preferentially select the terrestrial cellular network when the mobile terminal is in range thereof.

The SMS service centre 6 may also receive short message requests from mobile users, for example via a terrestrial cellular network or a mobile satellite system.

In FIG. 1, the SMS service centre 6 is connected to a mobile satellite system, such as the ICO™ system, which provides a messaging service including high penetration messaging. The mobile satellite system (MSS) 10 includes a plurality of satellite access nodes 12a, 12b which provide radio frequency communications links to a constellation of satellites 14a, 14b, 14c, at least some of which are in line-of-sight with a mobile user terminal 16 and enable wireless communications between one of the satellite access nodes 12 and the user terminal 16.

In one example described in GB 2,295,296A there are twelve satellite access nodes 12 located in optimal positions throughout the world. The satellite constellation comprises ten operational satellites in six-hour orbits in two orbital planes, each inclined at 45° to the equator. One spare satellite is provided in each plane. The arrangement of satellite access nodes 12 and satellites 14 provides a mobile satellite service with global coverage. Alternative mobile satellite systems, such as the Iridium™, Inmarsat™ or Odyssey™ systems may be used.

Each satellite access node 12 includes a land earth LES 18a, 18b with multiple directional antennas which track some or all of the satellites 14 which are in view. Each satellite access node 12 also includes a mobile satellite switching centre (MSSC) 20 which routes communications traffic to other satellite access nodes and to gateways owned by third party operators who are authorised to access the mobile satellite system. The SMS service centre 6 is an example of one such gateway. Each MSSC 20 is connected to a visitor location register (VLR) 22, which comprises a database of details of user terminals 16 which are logged on to that satellite access node 12.

Information obtained from the HLR 8 identifies with which satellite access node 12 the user terminal 16 is registered and the SMS service centre 6 routes a message to the appropriate satellite access node 12 on the basis of that information. At that satellite access node 12, the mobile satellite switching centre 20 obtains more specific information from the VLR 22 to determine the location of the user terminal 16 more accurately and to determine to what type of message service the user terminal 16 has subscribed.

This information determines how the satellite access node 12 will communicate with the user terminal 16, as discussed in more detail below.

Right Penetration Notification

A high penetration notification service is controlled by a high penetration notification (HPN) service centre 24 which communicates with the MSSC 20 and with the LES 18 of each satellite access node 12.

A high penetration notification (HPN) is a message which is transmitted by one or more of the satellites 14 with a substantially higher link margin than is used for short messages, voice or data traffic. The link margin is defined as the excess signal energy to noise density ratio needed adequately to decode a message in a line-of-sight channel.

For example, normal voice and data channels have sufficient link margin to be received by a hand-held user terminal in operational position with its antenna deployed, in direct line of sight to a satellite, or with light shadowing or fading. Short messages and control channels have sufficient link margin to be received by a hand held user terminal in a non-operational position, such as in a suitcase and/or with its antenna retracted and/or with medium/light radio shadowing or fading. A high penetration notification is used to send information to the user terminal 16 in situations where it may not be able to receive any other traffic, such as when the user terminal 16 is inside a building, in heavy radio shadowing or fading from any of the satellites 14 and with its antenna retracted. The link margin of a high penetration notification gives sufficient penetration to allow reception and decoding of data by the user terminal in these circumstances. For example, the link margin may be 28 dB. The link margin is a function of the transmit power and may additionally be increased by coding, such as convolutional coding.

NPN after Short Message Failure

One example of the use of a high penetration notification message will now be described with reference to FIGS. 1 and 2. At step 30, a message is transferred from the fixed user 2 to the SMS service centre 6. The message includes an identity code, such as a telephone number, which identifies the intended recipient, in this case the user terminal 16. At step 32, the SMS service centre 6 sends information identifying the user terminal 16 to the home location register 8, which replies with routing information such as the identity of the satellite access node 12 with which the user terminal 16 is registered. At step 34, the SMS service centre 6 forwards the message from the user 2 to the mobile satellite switching centre 20 of the satellite access node 12 identified by the home location register 8, together with information identifying the user terminal 16.

At step 36, the mobile satellite switching centre 20 accesses the visitor location register 22, extracts therefrom detailed information on the location of the user terminal 16 and determines whether the owner of the user terminal 16 has subscribed to the short message service. At step 37, the message is sent to the LES 18 together with information relating to the expected location of the user terminal 16.

At step 38, the LES 18 selects a satellite which is likely to achieve transmission of the message to the user terminal 16 and selects a beam generated by that satellite 14 which covers the location of the user terminal 16 at that moment. The message is then sent via the selected satellite 14 to the user terminal 16.

The LES 18 detects whether any acknowledgement of the message is received from the user terminal 16 within a predetermined period t1. If no such acknowledgement is received, a failure signal is sent, at step 40, to the mobile satellite switching centre 20, which then sends, at step 42, a failure report to the SMS service centre 6, which may in turn send a failure report 44 to the fixed user 2. In response to the failure report at step 42, the SMS service centre 6 updates the HLR 8 to include the information that the user terminal 16 is currently not responding to short messages.

In response to the paging failure at step 40, the mobile satellite switching centre 20 forwards the message contents to the HPN service centre 24 in an HPN request, at step 48. The HPN service centre 24 then requests location information, together with other information needed for sending an HPN message, from the mobile satellite switching centre 20, at step 50. The mobile satellite switching centre 20 obtains the required information from the home location register 8 at step 52 and from the visitor location register 22 at step 54, and sends the required information to the LES 18 at step 56.

At step 58, the HPN service centre 24 generates an HPN message derived from the original message which was transferred at step 48, and the LES 18 sends the HPN message at step 60 to the user terminal 16. The process of sending the HPN message at step 60 will be described in more detail below.

When the user terminal 16 receives the HPN message, it sends an acknowledgement signal to the LES 18 at step 62. In response to this acknowledgement, the LES 18 signals to the HPN service centre 24 that the HPN has been acknowledged, at step 64, and thereby prevents further attempts by the HPN service centre 24 to send an HPN message derived from the same original message.

HPN Incoming Call Alerting

Alternatively, the HPN message may be generated in response to failure to deliver an incoming voice, fax or data call to the user terminal 16. The process for delivering such calls is similar to the process for delivering short messages, as described above, except that the call is routed from the PSTN 4 to a gateway mobile satellite switching centre (GMSSC) which routes the call to a selected satellite access node 12. The LES 18 sends a paging signal on a broadcast channel identifying the user terminal 16 to which the call is addressed. If no response is received from the user terminal 16 within a predetermined time and the subscriber profile of the user terminal 16 includes HPN supplementary service, the mobile satellite switching centre 20 forwards information relating to the call to the HPN service centre 24, in a similar manner to step 48 and the process continues as in the short message example described above, except that the HPN message contents do not contain a short message sent by a caller but may instead contain information relating to the reason for the HPN request (e.g. failed incoming call) and/or the telephone number or identity of the caller. Repeated HPN requests resulting from further incoming calls from the same subscriber may be filtered out, as described below.

HPN Broadcast

The HPN message may be broadcast to more than one user terminal, for example to a defined user group or to all user terminals in a predefined area. HPN broadcasts are controlled by an HPN broadcast centre which communicates with each LES 18 in the same manner as the HPN service centre 24 or may form part of the HPN service centre 24. The HPN broadcast centre receives broadcast information from external information providers and controls the generation and scheduling of HPN broadcast messages.

No acknowledgement is required to HPN broadcast messages.

Diversity

Figure 2:
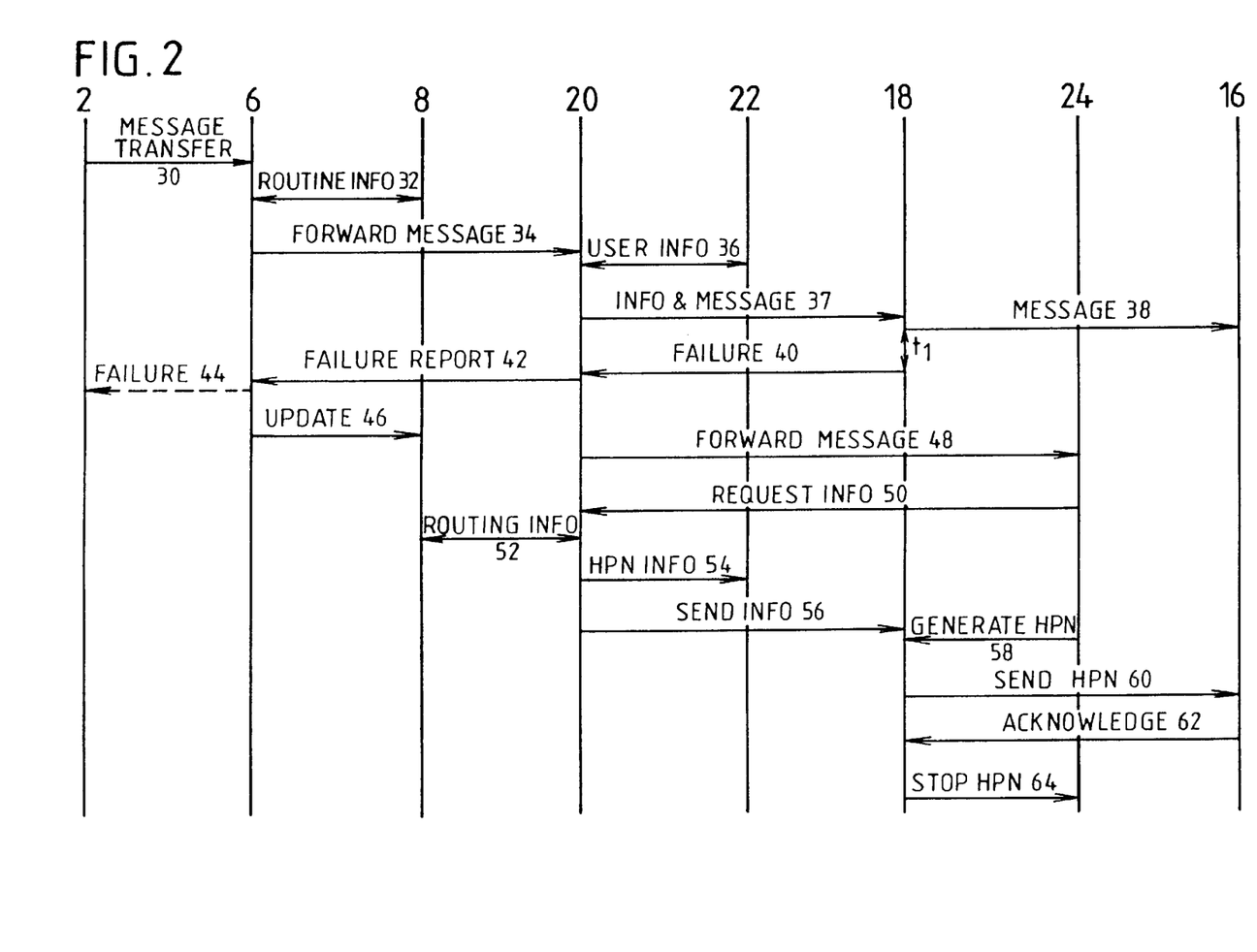
FIG. 2 is a sequence diagram of the transmission of an HPN signal following an unsuccessful attempt to deliver a short message in the network of FIG. 1.

Referring to FIG. 2, if no acknowledgement is received by the LES 18 at step 62, HPN service centre 24 commands the LES 18 to retransmit the HPN message after a predetermined short delay, for example in the next transmission phase cycle of the HPN channel. The delay may be determined according to the traffic load on the LES 18. Alternatively or additionally, the HPN message is re-sent by the LES 18 after a longer delay sufficient to allow the satellites 14 to move so that their direction from the user terminals 16 has changed significantly. The HPN message may then be repeated after the short delay.

If no acknowledgement is received from the user terminal 16 after a predetermined number of retransmissions of the HPN message, the HPN service centre 24 controls the LES 18 to retransmit the HPN message through another satellite 14 if the user terminal 16 has subscribed to this level of service. Although the user terminal 16 may not be able to receive an HPN message from the satellite 14a through which the HPN message was first transmitted, it may be able to receive the message through the second satellite 14b. The message is repeated a predetermined number of times, dependent on the traffic load, the priority of the message, and the subscription details of the user terminal 16, through the second satellite 14b until the LES 18 informs the. HPN service centre 24 when an acknowledgement is received.

Optionally, if no acknowledgement is received from the user terminal 16 after a predetermined number of repeats when transmitting through the first or second satellite 14a or 14b or another satellite, the HPN service centre 24 routes the HPN message through an alternative one of the satellite access nodes 12b, for example for transmission through one of the satellites 14c which is in view of the user terminal 16. This may be required when the third satellite 14b is not in view of the first satellite access node 12a. Any of the above diversity techniques may be used alone or may be combined in any sequence.

HPN Filtering

The HPN service centre 24 detects whether an HPN request has occurred for the same reason as a previous HPN request, by comparing the contents of the HPN request with a database of previously received HPN requests. For example if the short message content and subscriber identity is the same as those of a previously received HPN request, this indicates that either the fixed user 2 or the SMS service centre 6 attempted to repeat the same short message. If the HPN request resulted from incoming call failure, then the HPN service centre detects whether a previous HPN request has already been received relating to a call attempt from the same user 2 to the same user terminal 16.

In either case, the repeated HPN request is ignored by the HPN service centre 24. Alternatively, the repeated HPN request may be ignored only if the number of repeated requests exceeds a predetermined number.

HPN Request Contents

The HPN request sent to the HPN service centre 24 at step 48 includes the following information:

1. Identification of the subscriber to which the short message is directed, which may be of the same format as the IMSI (International Mobile Subscriber Identity) and the TMSI (Temporary Mobile Subscriber Identity) defined in GSM Technical specification 03.03. The TMSI is allocated by the VLR 22 when the user terminal 6 registers at the corresponding LES 18.
2. The mobile station international ISDN number, which may be of the same format as the GSM MSISDN.
3. The HPN subscription details of the subscriber, such as the priority to be assigned to the HPN message. Preferably, there are only two levels of priority: standard and high.
4. Location information relating to the user terminal 6, such as latitude, longitude, location area identification or cell global identification.
5. Information relating to the reason for the HPN request, such as failed short message or incoming call, and the type of service that triggered the HPN request, such as voice, facsimile or short message service.
6. Additional information for compiling the HPN message. For example, if the HPN request resulted from a short message failure, the additional information includes the header and content of the original short message.

HPN Message Contents

The HPN service centre 24 receives the original message and may derive the contents of the HPN message from the original message or may generate an HPN message independently of the content of the original message. For example, the HPN service centre 24 may discard the content of the message and generate a simple notification signal as the HPN message. In this case, the HPN message indicates simply to the user terminal 16 that an attempt has been made to communicate with it. Alternatively, the HPN message may consist of the telephone number of the fixed user 2, a truncated version of the original message or a user message tag which indicates one of a set of messages previously stored at the user terminal 16 (e.g. "I'm on the next train home").

HPN Message Burst

The HPN message is transmitted by the LES 18 in a message burst, consisting of a synchronisation preamble, system and satellite information, message data and error check data. The satellite information includes a code identifying the satellite used to transmit the HPN message.

The system information block may further include an acknowledgement channel frequency reference and an acknowledgement channel time delay reference, which informs the user terminal 16 which frequency to use for sending the acknowledgement signal, at step 62, and how long to delay before sending the acknowledgement.

HPN Transmission Channel

Figure 3:
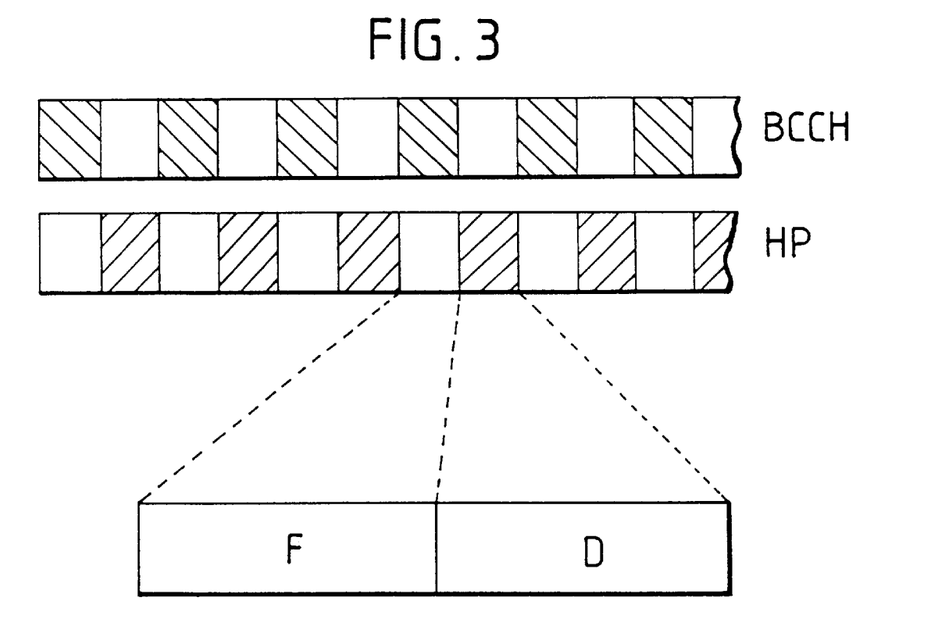
FIG. 3 is a diagram of a high penetration channel frame format in the sequence of FIG. 2.

The timing of the HPN transmission channel, as transmitted by one of the satellites 14, is shown in FIG. 3. The high-penetration message bursts HP are interleaved with broadcast channel bursts (BCCH). Each high penetration message burst comprises a data slot preceded by a synchronisation preamble burst F which provides a frequency and timing reference.

The timing of the broadcast channel and high penetration slots shown in FIG. 3 is referenced with respect to the satellite, so that the satellite is never required to transmit both broadcast channel and high penetration bursts at the same time. In this way, the peak power requirement of the satellite is kept below a defined limit, and power fluctuations in the satellite are avoided.

The user terminal 16 receives the system and satellite information and records the arrival time of the message burst. From this information, the user terminal 16 synchronises its own transmit and receive burst timing with that of the system.

HPN Message Types

The message burst contents further include a temporary user ID which identifies the user for which the message is intended, and a message ID which includes a message reference ID and a message type ID identifying the type of message to be sent.

The data slot D may contain a whole message or part of a longer message. In the latter case, the message contents of a series of data slots D addressed to the user terminal 16 are concatenated by the user terminal 16 to reconstruct the original message.

The message contents may be encrypted or scrambled so that only the user identified by the temporary ID is able to decode the message.

The message contents may be encoded so as to increase the effective link margin, for example by means of convolutional coding.

User Terminal

Figure 4:
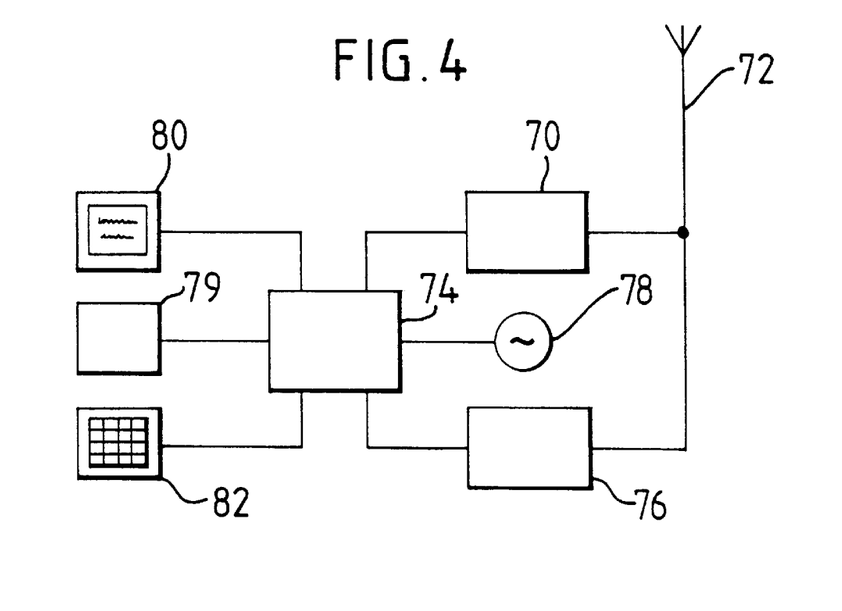
FIG. 4 is a schematic diagram of the user terminal in the network of FIG. 1.

The operation of the user terminal 16, when receiving an HPN signal, will now be described with reference to FIG. 4.

The user terminal comprises a receiver 70, which demodulates RF signals received from an antenna 72 and sends the demodulated signals to a controller 74. The controller 74 sends signals, such as the acknowledge signal of step 62, to a transmitter 76, which RF modulates the signal and outputs the RF modulated signal to the antenna 72 so that it is transmitted.

The controller 74 controls the frequency and timing of the receiver 70 and transmitter 76. The controller 74 includes a clock from which the receive and transmit timings are determined. The clock is driven by an oscillator 78. Messages received by the receiver 70 are stored in a memory 79 and can be displayed on a display 80, such as an LCD screen. The user controls the operation of the user terminal 16 by means of a key pad 82, so as to retrieve, display and clear messages. The memory 79 also stores a look-up table of messages which are identified by received message tags.

The user terminal 16 may also include a microphone, earpiece, analog-to-digital and digital-to-analog convertors and a codec so that it can be used as a mobile telephone. Alternatively, if the user terminal 16 is configured as a pager only, these additional parts may be omitted.

Sleep Mode

When the user terminal 16 is on standby and is not being used for voice or data calls, the controller 74 is normally in "sleep" mode in which the receiver 70 is switched off in order to conserve power, but periodically, determined by its clock, the controller 74 switches into an active mode in which the receiver 70 is switched on in order to be able to receive signals. The controller 74 is normally synchronised with the mobile satellite system 10 so that it switches into active mode in synchronism with the arrival time of message bursts.

Figure 5:
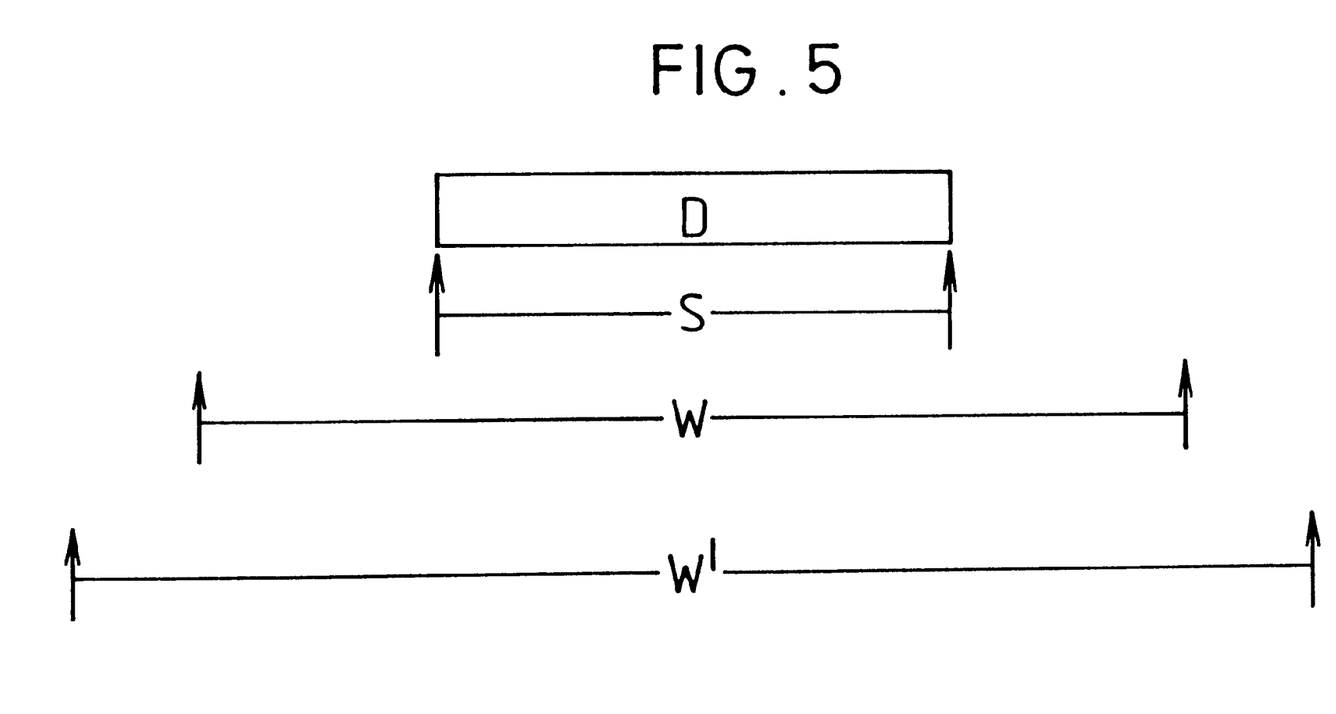
FIG. 5 is a diagram showing the width of a high penetration message slot in the format of FIG. 3 and of the active time windows necessary to receive the message.

As shown in FIG. 5, a slot window S is the period during which the receiver 70 must be active to receive the data slot D. An active window W, during which the controller 74 is in the active mode, is wider than the slot window S to accommodate the maximum change in propagation delay (the difference between the transmitting satellite being at minimum elevation above the horizon and being directly overhead).

However, if the user terminal 16 is out of contact with the mobile satellite system 10 for an extended period, controller 74 gradually loses synchronisation with the mobile satellite system 10 as a result of the limited accuracy of the oscillator 78 and uncertainties in the propagation time of signals from the satellites 14. The controller 74 increases the active time window as the period of being out of contact increases in order to allow for these uncertainties, for example to an extended time window W', but this increases the active duty cycle of the user terminal 16 and hence its power consumption. When the user terminal 16 receives an HPN message burst, the controller 74 synchronises its clock with the mobile satellite system 10 and can then reduce the size of its active time window back to the original time window W.

Figure 6:
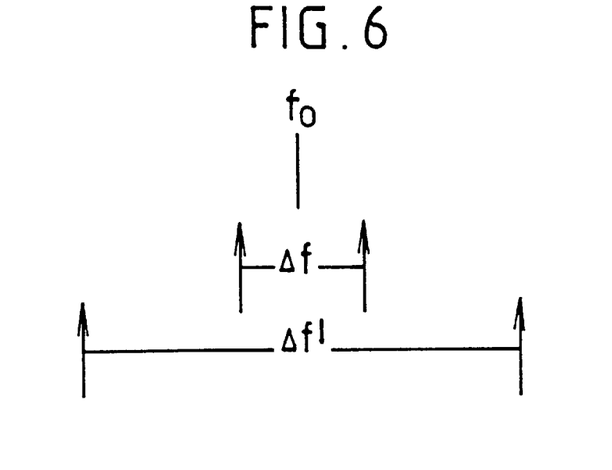
FIG. 6 is a diagram of the frequency signal acquisition window applied by the user terminal of FIG. 4.

Likewise, the frequency signal acquisition window of the user terminal 16 increases as the duration since the last burst was received increases. As shown in FIG. 6, the controller 74 expects to receive the next message burst at frequency $f_0$. The transmitted signal is Doppler compensated to the beam centre, but there will be a degree of uncertainty in the Doppler shift as a result of the position of the user terminal 16 in the beam relative to the beam centre. Hence, the controller 74 must set a minimum frequency acquisition window $\_f$ around $f_0$ to take account of the Doppler uncertainty.

Moreover, the uncertainty due to drift in the oscillator frequency of the receiver 70 increases with time since the last message burst was received. Hence, the width of the frequency acquisition window is increased by the controller 74, for example to an extended frequency acquisition window _f', until the next burst is received and the frequency acquisition window can be reduced to the original minimum width _f by determining the reference frequency of the preamble burst F.

Re-Registration

If the user terminal 16 receives a message which carries its user ID, this indicates that an attempt has been made to establish contact with the user terminal 16, for example to deliver a short message. The user terminal 16 continues to monitor the broadcast channel BCCH broadcast by a satellite 14 until it is able to receive this channel which sufficient quality. The user terminal then sends a re-registration signal to the LES 18, indicating that the user terminal 16 is now able to access the network.

The LES 18 determines from the re-registration request the current location of the terminal, for example by measuring the time delay and Doppler shift of the re-registration signal as received through the satellite 14, and updates the visitor location register 22 to record the user's current location.

If the HPN message was sent in response to a failed short message, the mobile satellite switching centre 20 then sends the original short message to the LES 18 for transmission to the user terminal 16 over a short message service channel, with a lower link margin than is used for the HPN burst.

If the HPN message was sent in response to the failure of an incoming call, the user terminal 16 may display to the user the caller identity which was sent in the HPN message and the type of service which caused the HPN message and may allow the user to call back the unsuccessful caller. For example, if the caller identity includes the telephone number of the calling party, the user terminal 16 displays the telephone number on the display 80 and the user need only press an "enter" or similar key on the key pad 82 to call back the unsuccessful caller. Alternatively, the GMSSC may attempt to re-establish the original call by calling both the calling party 2 and the user terminal 16 in turn and connecting them together.

HPN messages are also generated automatically at the mobile satellite switching centre 20 in response to prompts other than a failed short message transmission, or incoming call. For example, the mobile satellite switching centre 20 determines from the visitor location register 22 which user terminals have not been in contact with the mobile satellite system 10 for more than a predetermined length of time, and generates re-registration request HPN messages addressed to those user terminals. In response to receipt of the re-registration request HPN messages, the user terminals send re-registration requests to the LES 18 when they are able to receive registration channels. In this way, the locations of the user terminals logged on to the satellite access node 12 can be updated from time to time.

Satellite

The transmission power of the satellites 14 is limited by the power which is available from their solar arrays and from battery storage when the satellite 14 is in the earth's shadow. The high penetration notification bursts consume a significant proportion, as much as 20%, of the total transmit power of the satellite 14. Therefore, each satellite 14 provides only one HPN transponder which is shared among the LESs 18 and among the transmit beams of the satellite 14.

Figure 7:
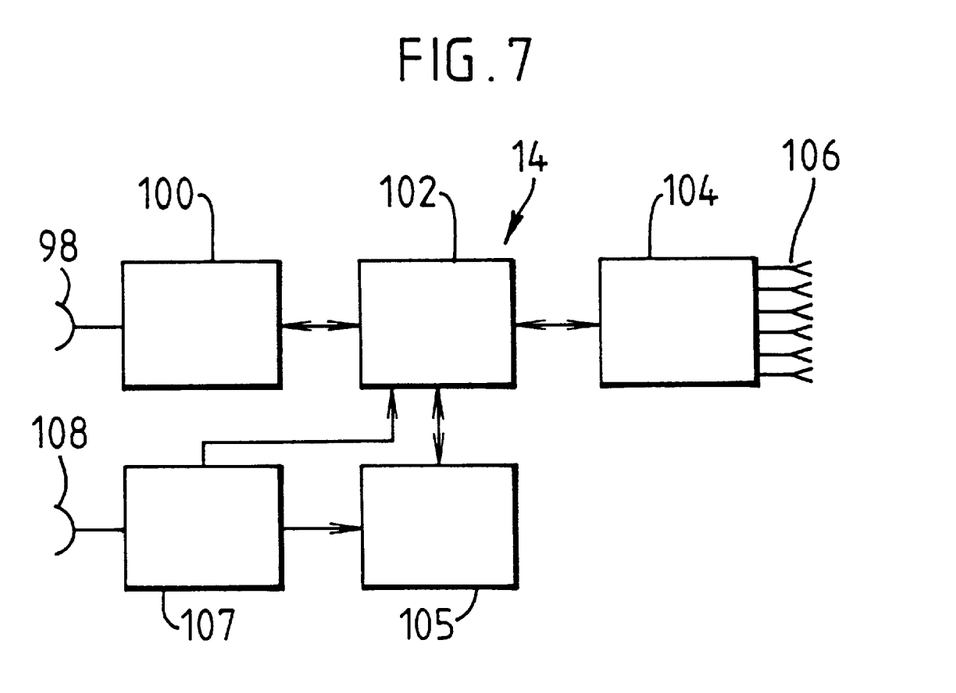
FIG. 7 is a schematic diagram of one of the satellites in the network of FIG. 1.

As shown in FIG. 7, each satellite 14 has a feeder link communication subsystem 100, which transmits and receives communications channels through a feeder link with the LES 18, by means of a feeder link antenna 98. The feeder link antenna 98 generates a broad beam covering substantially all of the earth's surface within the field of view of the satellite 14, so as to receive signals from any one of the satellite access nodes 12 within the field of view. The feeder link communications subsystem 100 is connected via a channel processing subsystem 102 to a mobile communications subsystem 104, which controls a multi-beam antenna array 106. The mobile communication subsystem 104 and multi-beam antenna 106 generate an overlapping array of spot beams over the coverage area of the satellite 14, which provide user links to mobile user terminals.

The channel processing subsystem 102 maps feeder link channels onto mobile link channels in the spot beams generated by the mobile communication subsystem 104 according to a resource management system 105, including a channel assignment table which can be modified by signals received from the LES 18 via a telemetry, tracking and control (TT&C) subsystem 107 of the satellite 14. The TT&C subsystem 107 receives channel assignment information from one or more of the LESs 18 by means of a TT&C antenna 108.

Details of an example of the satellite communication system are given in patent publication number WO95/28747.

The output of the HPN transponder is connected to only one of the beams of the multibeam antenna 106 at any one time, as a result of the limit on the instantaneous power of the HPN message burst. The beam to which the HPN transponder is connected can be selected for each HPN message burst, as will now be described.

The feeder link communication subsystem 100 allocates a dedicated frequency channel in the feeder link to HPN message bursts. The channel assignment table 105 comprises a data store storing a set of data triplets representing the beam assignment, the mobile link frequency assignment and the transponder gain for the HPN transponder. At a predetermined time before an LES 18 sends an HPN message burst, the LES 18 transmits to the TT&C subsystem 107 a selection command which identifies one of the data triplets in the channel assignment table. That data triplet determines in which beam, at what frequency, and with what gain the subsequent HPN message burst will be transmitted. The resource management subsystem 105 controls the channel processing subsystem 102 to allocate the indicated beam, frequency and gain to the HPN transponder after a predetermined interval from the reception of the selection command, in synchronism with the reception of the subsequent HPN message burst so that the HPN message burst is transmitted with that allocation.

In this way, the HPN transponder can be assigned to any one of the spot beams, under control of any one of the LESs 18 within view of the satellite 14.

HPN Scheduling Since each of the LESs 18 within the line of sight of the satellite 14 is able to send an HPN message to that satellite 14 and is able to control the beam assignment for that message, negotiation between satellite access nodes 12 is required so as to schedule the HPN resource between the satellite access nodes 12.

The satellite access nodes 12 are interconnected by a network, such as described in GB 2 295 296A. The network may comprise telephone or ISDN lines, proprietary lines or any other type of connection which allows reliable communications between the satellite access nodes 12. The satellite access nodes 12 also communicate with each other via the C-to-C band links provided by the satellites 14.

At predetermined intervals, for example every five to ten seconds, each satellite access node 12 transmits to each of the other satellite access nodes 12 information on the queued messages which that satellite access node 12 is ready to send. The information includes the location of the intended recipient user terminal, the frequency channel and time slot to be used in the mobile link, the length of the message and the priority assigned to it. Each of the satellite access nodes 12 compiles data on all of the queued messages waiting to be transmitted at any of the satellite access nodes 12.

Each satellite access node 12 applies the same scheduling algorithm to the compiled list of messages to determine the order in which the messages should be sent in the feeder link HPN channel. Since the same algorithm is applied to the same data at each satellite access node 12, the same decision is made at each satellite access node 12 on the order in which HPN messages are sent in the dedicated feeder link channel and the HPN burst can be transmitted by the LESs 18 to each satellite 14 without collision in the feeder link channel. The scheduling algorithm also determines the frequency and time slot assigned to the user terminal 16 for acknowledgement, so as to avoid collision between acknowledgement signals from user terminals 16.

Any messages which are not acknowledged by the respective user terminal 16 are kept in the queue of messages at each satellite access node 12 and will be included in the next list of messages sent to the other satellite access nodes 12.

Since the HPN message burst provides synchronisation information to all user terminals 16 within the coverage area of a spot beam, it is preferred that an HPN burst should be transmitted in each spot beam at intervals less than a predetermined maximum. The algorithm used by the satellite access nodes 12 determines the ordering of the messages in accordance with the spot beam to which the messages will be delivered, so as to ensure that all of the spot beams are allocated at least one HPN message within the maximum interval. If required, dummy messages are added to the message queue at one of the satellite access nodes to ensure that this criterion is satisfied. If no HPN messages are assigned to any time slot, a dummy message is added to fill that time slot, so as to avoid power fluctuations in the satellite.

While the above embodiments have been described with reference to a mobile satellite communications system, aspects of the invention are also applicable to terrestrial cellular and non-cellular mobile communications systems.

The apparatus of the communications system is described in terms of functional blocks. However, the skilled person will appreciate that the blocks do not necessarily represent discrete physical units but instead the functions of several blocks may be integrated or a single function may be distributed among discrete units.

The above embodiment uses a TDMA channel format to separate message bursts in the HPN channel. However, the scheduling algorithm may also be applied to other multiple access formats, such as CDMA or spread spectrum TDMA. For example, the scheduling algorithm may determine the spread-spectrum code to be used for each message.

Preferably, the HLR 8 and the VLR 22 comprise HLR and VLR apparatus based on designs for use with a GSM system, to allow the use of off-the-shelf components and reduce development costs. Alternatively, equipment specifically developed for a mobile satellite system or a non-GSM terrestrial system may be used.

References to mobile user terminals will be understood to include hand-held terminals, vehicle-mounted terminals including aeronautical and marine terminals, and temporary or permanent installations such as wireless telephone booths or stations or telephone networks connected to a wireless communications link.

Aspects of the present invention are applicable to terrestrial cellular systems such as GSM systems. Aspects of the present invention may be applied to mobile satellite systems such as the proposed Iridium™ and Odyssey™ systems.

It will be understood that components of embodiments of the invention may be located in different jurisdictions or in space. For the avoidance of doubt, the scope of the protection of the following claims extends to any part of a telecommunications apparatus or system or any method performed by such a part, which contributes to the performance of the inventive concept as defined in the claims.

What is claimed is:

1. A method of transmission to a wireless mobile transceiver, comprising:
   transmitting a first signal containing message data to said mobile transceiver;
   detecting whether a first acknowledgement signal indicating reception of said first signal is received from said mobile transceiver, and, if said first acknowledgement signal is not received,
   transmitting a second signal to said mobile transceiver, wherein said second signal is transmitted to said mobile transceiver with a margin substantially higher than that of the transmission of said first signal to the mobile transceiver, and the message data content of the second signal is shorter than that of the first signal but includes information relating to the fist signal.

2. A method as claimed in claim 1, further comprising detecting whether a second acknowledgment signal indicating reception of said second signal is received from said mobile transceiver, and, if said second acknowledgement signal is not received, transmitting a third signal to said mobile transceiver with a substantially higher margin than that of the transmission of said first signal to the mobile transceiver, said third signal having substantially the same data content as the second signal, and detecting whether a third acknowledgement signal, indicating reception of said third signal, is received from said mobile transceiver.

3. A method as claimed in claim 2, wherein said second signal transmission step is performed via a first transmitter and the third signal transmission step is performed via a second transmitter spatially remote from the first transmitter.

4. A method as claimed in claim 3, wherein the first and second transmitters comprise respectively first and second satellites.

5. A method as claimed in claim 3, wherein the first and second transmitter comprise respectively first and second base stations.

6. A method as claimed in any preceding claim, wherein said second signal includes timing information relating to the transmission timing of the second signal.

7. A method as claimed in claim 1, wherein said second signal is transmitted to the mobile transceiver together with frequency reference information.

8. A method as claimed in claim 1, wherein the first and second signals are transmitted via satellite, the second signal being transmitted from a satellite with a margin substantially higher than that of the first signal.

9. A method as claimed in claim 1, wherein the acknowledgement signal or signals are received via satellite.

10. A method as claimed in claim 1, further comprising:
receiving from the mobile transceiver a re-registration signal, and subsequently retransmitting said first signal to the mobile transceiver with a margin lower than that of the transmission of the second signal.

11. Apparatus for transmission of signals to a wireless mobile transceiver, comprising:
means for transmitting a first signal containing message data to said mobile transceiver;
means for detecting whether a first acknowledgement signal is received from said mobile transceiver, said first acknowledgement signal indicating reception of said first signal by said mobile transceiver, and
means for transmitting a second signal to said mobile transceiver if said first acknowledgement signal is not received, such that the second signal is transmitted to said mobile transceiver at a substantially higher margin than that of the transmission of said fist signal to the mobile transceiver; wherein the message data content of the second signal is shorter than that of the first signal but includes information relating to the first signal.

12. Apparatus as claimed in claim 11, further comprising:
means for detecting whether a second acknowledgement signal indicating reception of said second signal is received from said mobile transceiver,
means for transmitting a the signal to said mobile transceiver with a substantially higher margin than that of the transmission of said first signal to the mobile transceiver, said third signal having substantially the some data content as the second signal, and
means for detecting whether a Bird acknowledgement signal indicating reception of said third signal is received from said mobile terminal.

13. Apparatus as claimed in claim 11 or 12, wherein said second signal includes frequency reference information and/or timing information.

14. The apparatus as claimed in claim 11, wherein said apparatus is included in a ground station and said means for transmitting said it and second signals are arranged to transmit said signals via satellite.

15. Apparatus as claimed in claim 11, wherein said means for transmitting said second signal comprises a first transmitter and said means for transmitting said third signal comprises a second transmitter spatially remote from said first.

16. The apparatus as claimed in claim 11, including means for receiving from the mobile transceiver a re-registration signal, and subsequently retransmitting said first signal to the mobile transceiver with a margin lower than tat of the transmission of the second signal.

17. An apparatus for transmission of signals to a wireless mobile transceiver, comprising:
a transmitter to transmit a first signal containing message data to said mobile transceiver;
a detector to detect whether a first acknowledgement signal is received from said mobile transceiver, said first acknowledgement signal indicating reception of said first signal by said mobile transceiver, wherein:
the transmitter is arranged to transmit a second signal to said mobile transceiver when said first acknowledgement signal is not received, such that the second signal is transmitted to said mobile transceiver at a substantially higher margin than that of a transmission of said first signal to the mobile transceiver, and the message data content of the second signal is shorter than that of the first signal but includes information relating to the first signal.

18. The apparatus of claim 17, wherein:
said detector is arranged to detect a second acknowledgement signal indicating reception of said second signal by said mobile transceiver; and
the transmitter is arranged to transmit a third signal to said mobile transceiver with a substantially higher margin than that of a transmission of said first signal to the mobile transceiver, said third signal having substantially a same data content as the second signal, and
the apparatus further comprising a second detector arranged to detect a third acknowledgement signal indicating reception of said third signal by said mobile terminal.

19. The apparatus of claim 17, wherein the detector is arranged to detect a second acknowledgement signal indicating reception of said second signal by said mobile transceiver, the apparatus further comprising:
a second transmitter, spatially remote from said fist transmitter, arranged to transmit a third signal to said mobile transceiver with a substantially higher margin than that of a transmission of said first signal to the mobile transceiver, said third signal having substantially a same data content as the second signal, and
a second detector arranged to detect a third acknowledgement signal indicating reception of said third signal by said mobile terminal.

20. The apparatus as claimed in one of claims 17 and 19, wherein said second signal includes frequency reference information and/or timing information.

21. The apparatus of claim 17, wherein the apparatus is included in a ground station and the transmitter is arranged to transmit said signals via satellite.

22. The apparatus of claim 17, further comprising:
a receiver arranged to receive a re-registration signal from said mobile transceiver, wherein
said transmitter is arranged to retransmit said first signal to said mobile transceiver with a margin lower than that of a transmission of the second signal after said receiver receives said re-registration signal.

23. A method of transmission to a wireless mobile transceiver, comprising;
transmitting a first signal containing message data to said mobile transceiver;
detecting whether a first acknowledgement signal indicating reception of said first signal is received from said mobile transceiver, and, if said first acknowledgement signal is not received,
transmitting a second signal to said mobile transceiver, wherein said second signal is transmitted to said mobile transceiver with a margin substantially higher than that of the transmission of said first signal to the mobile transceiver, and message data of the second signal is generated independently of the message data of the first signal.

24. Apparatus for transmission of signals to a wireless mobile transceiver, comprising:
means for transmitting a first signal containing message data to said mobile transceiver;
means for detecting whether a first acknowledgement signal is received from said mobile transceiver, said first acknowledgement signal indicating reception of said first signal by said mobile transceiver, and means for transmitting a second signal to said mobile transceiver if said first acknowledgement signal is not received, such that the second signal is transmitted to said mobile transceiver at a substantially higher margin than that of the transmission of said first signal to the mobile transceiver, wherein message data content of the second signal is generated independently of the message data of the first signal.

25. An apparatus for transmission of signals to a wireless mobile transceiver, comprising:

a transmitter to transmit a first signal containing message data to said mobile transceiver, a detector to detect whether a first acknowledgement signal is received from said mobile transceiver, said first acknowledgement signal indicating reception of said first signal by said mobile transceiver, wherein:

the transmitter is arranged to transmit a second signal to said mobile transceiver when said first acknowledgement signal is not received, such that the second signal is transmitted to said mobile transceiver at a substantially higher margin than that of a transmission of said first signal to the mobile transceiver, and message data of the second signal is generated independently of the message data of the first signal.

26. A method of transmission to a wireless mobile transceiver, comprising:

transmitting a first signal containing message data to said mobile transceiver;

detecting whether a first acknowledgement signal indicating reception of said first signal is received from said mobile transceiver, and, if said first acknowledgement signal is not received, transmitting a second signal to said mobile transceiver, wherein said second signal is transmitted to said mobile transceiver with a margin substantially higher than that of the transmission of said first signal to the mobile transceiver, and message data content of the second signal comprises a user message tag, replacing the message data of the first signal.

27. Apparatus for transmission of signals to a wireless mobile transceiver, comprising:

means for transmitting a first signal containing message data to said mobile transceiver;

means for detecting whether a first acknowledgement signal is received from said mobile transceiver, said first acknowledgement signal indicating reception of said first signal by said mobile transceiver; and means for transmitting a second signal to said mobile transceiver if said first acknowledgement signal is not received, such that the second signal is transmitted to said mobile transceiver at a substantially higher margin than that of the transmission of said first signal to the mobile transceiver, wherein message data content of the second signal comprises a use message tag, replacing the message data of the first signal.

28. Apparatus for transmission of signals to a wireless mobile transceiver, comprising:

a transmitter to transmit a first signal containing message data to said mobile transceiver;

a detector to detect whether a first acknowledgement signal is received from said mobile transceiver, said first acknowledgement signal indicating reception of said first signal by said mobile transceiver, wherein:

the transmitter is arranged to transmit a second signal to said mobile transceiver when said fist acknowledgement signal is not received, such that the second signal is transmitted to said mobile transceiver at a substantially higher margin that of a transmission of said first signal to the mobile transceiver, and message data content of the second signal comprises a user message tag, replacing the message data of the first signal.

\* \* \* \* \*

UNITED STATES PATENT AND TRADEMARK OFFICE
CERTIFICATE OF CORRECTION

PATENT NO. : 6,763,240 B1
DATED : July 13, 2004
INVENTOR(S) : Paul Chambers et al.

It is certified that error appears in the above-identified patent and that said Letters Patent is hereby corrected as shown below:

Column 13,
Line 29, please replace "the" with -- third --
Line 34, please replace "Bird" with -- third --
Line 42, please replace "it" with -- first --
Line 52, please replace "tat" with -- that --

Column 14,
Line 22, please replace "fist" with -- first --

Column 16,
Line 30, please replace "fist" with -- first --

Signed and Sealed this

Twenty-sixth Day of July, 2005

JON W. DUDAS
*Director of the United States Patent and Trademark Office*